Aug. 5, 1969   B. J. STEPTOE ET AL   3,459,847
METHOD FOR MOULDING FLUID-OPERATED CONTROL DEVICES
Filed Dec. 6, 1966   2 Sheets-Sheet 1

INVENTORS
BRIAN JOHN STEPTOE
DAVID HAWGOOD
BY SIDNEY TIES

Haine and Nydick
ATTORNEY

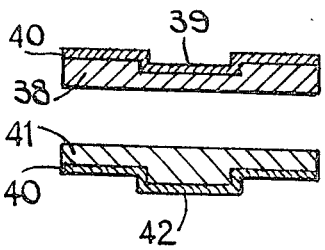
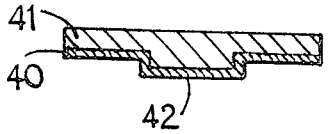
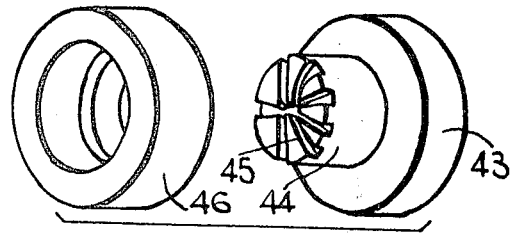
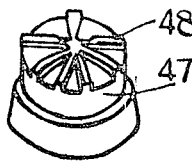
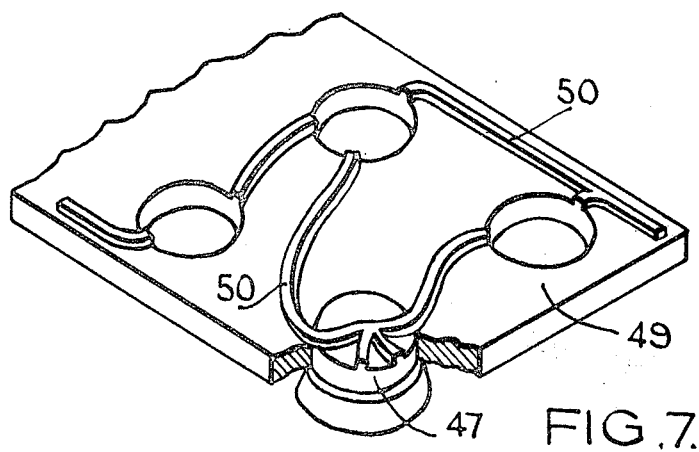

United States Patent Office 3,459,847
Patented Aug. 5, 1969

3,459,847
METHOD FOR MOULDING FLUID-OPERATED CONTROL DEVICES
Brian John Steptoe, Hitchin, and David Hawgood and Sidney Ties, Stevenage, England, assignors to International Computers and Tabulators Limited, London, England, a British company
Filed Dec. 6, 1966, Ser. No. 599,593
Claims priority, application Great Britain, Dec. 7, 1965, 51,759/65
Int. Cl. B29c 1/02
U.S. Cl. 264—219
4 Claims

ABSTRACT OF THE DISCLOSURE

Fluid logic amplifier elements having optimum operating characteristics are produced by making an element by etching or machining from a block of material, then connecting the element to fluid sources and measuring the operating characteristics of the element. The element is then modified to improve its characteristics and it is then retested. This modification and retesting of the element is repeated until the desired characteristics are obtained. An inverse copy of the element, having the desired characteristics, is produced by a moulding process or by plating the element with a layer of metal, reinforcing the metal layer and then dissolving away the element. The inverse copy is utilised as a pattern from which a plurality of elements, identical in configuration and operating characteristics to the tested and modified element, are produced by a moulding process.

Figure 1:
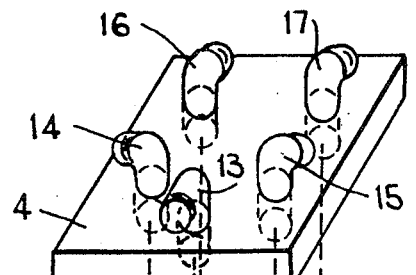

An interconnected array of amplifiers is produced by assembling a plurality of reproductions of the elements in a plate having the required channels for the passage of fluid and producing an inverse copy of the assembly for which reproductions of the assembly are produced by a moulding process. Alternatively, the inverse of the required assembly may be formed by assembling a plurality of inverse copies of the element in a plate carrying an inverse pattern of the required connecting channels.

---

The present invention relates to fluid-operated control devices utilising fluid flow to perform amplifying or switching functions and in particular to methods of producing such devices.

Various fluid operated devices have been proposed which operate by control the flow of fluid stream and such devices have a number of chambers, to which fluid is supplied or exhausted respectively, which are linked by passage ways of predetermined configuration. For example, in one form of fluid amplifier, fluid is introduced into one chamber and passes through an orifice into a main passage. The fluid stream issuing from the orifice is referred to as the power stream. Two further chambers open through orifices into opposite sides of the main passage. These further chambers are selectively supplied with fluid to produce control fluid-streams which interact with the power stream to cause it to enter one or other of two branch passages at the downstream end of the main passage according to which one of the control streams is flowing.

It has been proposed to construct the fluid-operated devices of three laminations, the centre lamination having an aperture in it which corresponds to the required configuration of chambers, orifices and passages. The outer laminations are sealed to the centre lamination and fluid connections are made through one of the outer laminations to the chambers in the centre lamination. The aperture in the centre lamination may be cut mechanically but where a number of similar devices are required it is usual to form to the aperture by a photo etching process. In such a process a master negative is prepared by drawing on suitable transparent or translucent material and an image of the negative is transferred to sensitised material which is then processed to etch away unwanted parts of the material. If the resulting device does not have the required characteristics, it is then necessary to modify the negative and produce a further device by etching repeatedly until a device having the required response characteristics has been produced. It will be realised that this process of progressive modification of a negative and producing devices from the modified neative is time consuming. Moreover, because the production of a number of devices involves the separate etching of each of them, the accuracy of reproduction is subject to any variations there may be in the etching process. In particular, variations in temperature or composition of the etching baths used may adversely affect the response characteristics of the devices. Similarly mechanical reproduction of devices is subject to variations which affect the response characteristics.

According to the invention a method of producing fluid-operated control devices includes the steps of producing an element having a cavity for the interaction of fluid streams; testing said element by applying operational fluid streams to the cavity to evaluate the characteristics of the element under operational conditions; physically modifying the cavity of the element until the element has optimised response characteristics; producing an inverse copy of the modified element using the modified element as a pattern; and producing from said inverse copy, by a moulding or casting process, a plurality of elements all having response characteristics substantially identical with said modified element.

Figure 2:
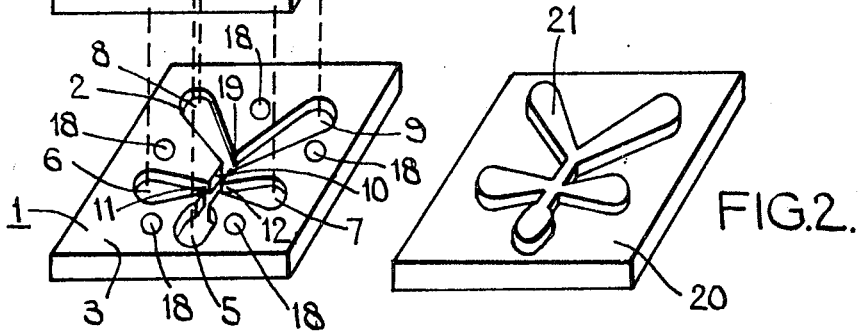
Figure 3:
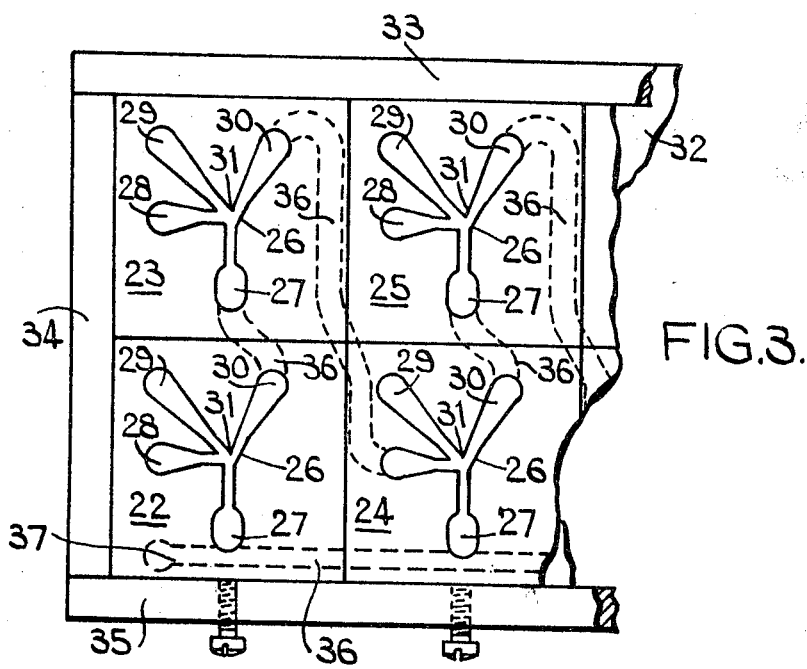

The invention will now be described by way of example with reference to the accompanying drawings in which:

FIGURE 1 shows schematically an element for a fluid operated device and a block for making fluid connections to the element, FIGURE 2 shows an inverse copy derived from the element shown in FIGURE 1, FIGURE 3 shows part of a network of interconnected elements, FIGURE 4a shows a section through an element and plated inverse copy of the element, FIGURE 4b shows a section through the plated inverse copy of FIGURE 4a with a support backing, FIGURE 5 shows an alternative construction of element and mould ring, FIGURE 6 shows an inverse copy of the element of FIGURE 5, and FIGURE 7 shows a patern block and inserted inverse copy of an element for producing a network of interconnected devices.

Referring now to FIGURE 1 and element 1 of a fluid amplifier consists of a block having a recess 2 formed in a planar face 3 thereof. The recess 2 is shaped so as to provide, when the element 1 is clamped to a second block 4, a power stream inlet chamber 5, a pair of control stream chambers 6 and 7 and a pair of outlet chambers 8 and 9. The recess also provides a passage 10 communicating at one end through a narrow opening with the inlet chamber 5 and which branches at its other end into a pair of passages opening into the outlet chambers 8, 9 respectively. The control stream chambers 6 and 7 open through orifices 11, 12 respectively into opposite sides of the passage 10. The block 4 carries an inlet tube 13 which communicates with the inlet chamber 5, a pair of control stream tubes 14, 15 which communicate with control chambers 6, 7 respectively and a pair of outlet tubes 16, 17 which communicates with the outlet chambers 8, 9 respectively. The block 4 is clamped in fluid tight engagement with the face 3 of element 1 for example by means of screws passing through holes 18 in the element 1 into tapped holes (not shown) in the block 4.

In the operation of the fluid amplifier, a fluid, such as air, is supplied under pressure through the inlet tube 13 to the power stream inlet chamber 5 from which it passes through the narrow opening into the passage 10. This power stream in the passage 10 is divided at the branch by a splitter 19 and passes into the outlet chambers 8, 9 from which the fluid is exhausted through the tubes 16, 17. If fluid is supplied through tube 14 to the control chamber 6, the control stream issuing from the orifice 11 interacts with the power stream and the entire fluid flow passes to one side of the splitter 19 into the outlet chamber 9. However, if the control stream from chamber 6 is terminated and fluid is supplied through tube 15 to the control chamber 7 to produce a control stream issuing from orifice 12, all the fluid flow is diverted to the other side of the splitter 19 and passes into the outlet chamber 8. Thus by selectively applying fluid to the control chambers 6, 7 the passage of the power stream from inlet chamber 3 to the outlet chambers 8 and 9 is controlled.

Various modes of operation have been proposed for fluid operated control devices and different forms of control devices have been developed. A number of these devices have been reviewed in an article entitled "Fluid Control Devices" by Stanley W. Angrist, in "Scientific American," December 1964. From this article it will be seen that the response characteristics of the devices depend upon the characteristics, such as pressure and velocity of flow, of the fluid and upon the particular configuration of the recess 2. Therefore for predetermined conditions of operation of a device it is frequently necessary to determine the final shape of the recess experimentally to obtain the optimum response characteristics of the device.

The recess 2 in the element 1 may be cut into a block of suitable material by machining or by a photo etching process. When using a photo etching process a master negative is prepared by drawing on a transparent or translucent sheet material and an image of the negative is produced on a layer of photo sensitive material on the block. This material is then processed so that unwanted areas of the block can be etched away in the conventional manner. The resultant element is then clamped to the block 4 and is tested under operational conditions by the acquired application of fluids through the tubes carried by the block 4. After the element 1 has been tested it is removed from the block 4 and the configuration of the recess is modified either by depositing extra material on or by removing material from the element as required to improve the response characteristics of the element. The element is then clamped to the block 4 and retested. The element is removed from the block 4 and, if it has the desired response characteristics, replicas of the element are produced as described hereinafter but if the response characteristics are not satisfactory further modification of the element is carried out and the element is retested until it has the desired response characteristics. The element may be formed in a relatively soft metal such as brass so that modification of the configuration of the recess can be effected by removing material by machining or by adding material by building up layers, of for example, solder or epoxy-resin and then machining the added material.

When an element having satisfactory response characteristics has been produced, replicas of this element are produced by the following method. The element 1 is enclosed in a moulding box and is coated with a parting agent. Epoxy-resin is poured into the box and left to set. When the resin has set, the box and the element 1 are removed leaving a pattern block 20 (FIGURE 2) of resin having a raised portion 21 which corresponds in shape to the recess 2 in the element 1 so that the block 15 is an inverse copy of the element 1. The process is now repeated using the block 15, in place of the element 1, as a pattern to produce the required number of copies or replicas of the element 1.

Finally each of these copies or replicas may be tested by clamping them temporarily in a jig in contact with a fluid connection block as hereinbefore described.

It will be appreciated that although the use of epoxy resin for making the pattern block 20 and the replicas of the element 1 has been described, other materials may be used. For example, the pattern block may be made in plaster of Paris or, if the element 1 is made wholly of brass or similar material, the pattern may be cast in type-metal.

Fluid-operated apparatus consisting of a network of interconnected fluid operated devices may be produced utilising a method similar to the method described above for the production of single devices. Referring to FIGURE 3 the apparatus includes a group of identical fluid amplifier devices formed of elements 22, 23, 24 and 25 respectively. Each element has a recess 26 shaped to provide a power stream inlet chamber 27, a control stream inlet chamber 28 and outlet chambers 29, 30 respectively separated by a splitter 31. The elements 22, 23, 24 and 25 are assembled on a base 32 between locating strips 33, 34, 35. In order to secure the elements on the base 32, screws 36 are provided in the strip 35 to clamp the elements against strip 33. Alternatively the elements may be secured by cement or adhesive to the base. In yet another construction, the base 32 may be formed with recesses or apertures into which the elements are fitted and secured.

When the elements have been assembled on the base 32, interconnecting channels 36 are formed as shown by dotted lines. The output chamber 30 of element 22 is connected to the inlet chamber 27 of element 23; the outlet chamber 30 of element 23 is connected to control inlet chamber 28 of element 24; outlet chamber 30 of element 24 is connected to power inlet chamber 27 of element 25. The power inlet chambers 27 of elements 22 and 24 are connected to a common input chamber 37. The splitter 31 of each of the elements is offset toward the output 30 so that, when a control stream is not applied to the control chamber 28, the power stream enters the output chamber 29. The power stream is diverted to output chamber 30 when a control stream is applied. Clearly there will be an output from chamber 30 of element 25 only if a control stream is applied to each of elements 22, 23, and 25.

The elements 22, 23, 24 and 25 are preferably made by the replication method described above and where, as in the present example, all the elements are required to be identical they are copied from a single element having the required response characteristics. The interconnecting channels 36 are formed by machining or cutting into the elements. It will be appreciated that where the exact configuration and dimensions of the channels 36 are not critical they may be formed by a photo-etching process without imparing the response characteristics of the apparatus. However, if the configuration and dimensions of the channels 36 are critical it is preferred to form them by machining.

After all the required interconnecting channels have been formed, replicas of the entire group of elements may be produced by the method described for producing replicas of single elements. Thus, an inverse pattern block of the group is produced from which replicas of the group are produced. Finally the element group is clamped to a block provided with the required fluid supply tubes.

The pattern block from which the required elements or networks are formed may be produced by a plating process as follows. The element 38 (FIG. 4a) having a recess 39 is formed of epoxy resin and a layer 40 of copper or nickel is plated onto the element. This layer is then built up to a thickness of at least 1/16" by electroless deposition. The element 38 is then dissolved away using chloroform as a solvent thereby leaving the copper or nickel layer 40. The copper or nickel layer is preferably reinforced by casting epoxy-resin or metal 41 onto the upper surface of the layer 40 (as shown in FIGURE 4b). If desired the reinforcing material may be applied to the layer 40 prior to dissolving the element 38. It will be realised that the raised portion 42 of the layer 40 is an inverse copy of the recess 39 in the element 38. Thus the composite block shown in FIGURE 4b can then be used as a pattern for producing copies of the element 38. Since the pattern is metal faced a hot moulding or setting process may be used to decrease the setting time of the casting resin without causing deterioration of the pattern thereby allowing the copies to be produced in a shorter time. Obviously this construction of pattern block may be produced in the reproduction of a complete network of elements.

In FIGURE 5 there is shown an alternative construction of element. The recess for an element is formed on an end face 45 of a block of brass having a cylindrical portion 44 and a base portion 43 of enlarged diameter. The element is tested by clamping the block to a fluid connection block and the configuration of the recess is modified as previously described. Inverse copies of the element are produced by inserting the portion 44 of the block into a moulding ring 46 and then casting epoxy resin in the mould is formed. FIGURE 6 shows a slug 47 carrying the inverse copy 48 of the recess of the element produced from the casting process. A plate 49 (FIGURE 7) having circular holes to receive the slugs 47 is formed with raised strips 50 corresponding to the inverse of the required interconnecting channels and fluid supply channels for the elements. For clarity only some of the required connections passages strip 50 are shown. The plate 49 may be formed of Dycril so that the channel pattern is formed by etching or of brass and the channel pattern is produced by engraving. The slugs 47 corresponding to the required fluid-operated devices are inserted into the holes in the plate 49 to form a composite pattern block for casting a complete network of interconnected elements.

The process may be shortened by using a number of inverse copies of the elements, as shown in FIGURE 2, to form the network shown in FIGURE 3. Thus, in this modified process an element having the required characteristics is produced in the manner previously described and a number of inverse copies are produced from this element. The inverse copies are then assembled on the base plate 32. The interconnections are formed by depositing material onto the pattern blocks to build up raised strips corresponding to the required interconnections. Thus, by using this assembly of pattern blocks as a pattern, complete networks can be produced by moulding or casting without the necessity of forming copies of the original element and of forming a unitary inverse pattern as was described above.

In the foregoing examples of networks of elements it has been assumed that all the devices of the network are identical. However, it may be required that a number of different devices are employed in the network. However, even in this case it may be necessary that some devices have identical characteristics. Hence, it will be appreciated that the above described methods of producing a network of devices ensure that all copies of the network are substantially identical and that devices in the network which are required to be identical have substantially identical characteristics. Also all devices in the network have optimum response characteristics. Further, apart from the method described with reference to FIGURE 4, the original elements having the optimum characteristics are preserved for use as master elements in forming any subsequently required network and are not themselves modified by the provision of interconnections.

It will also be appreciated that these processes of replication can be used to build up sub-sets of elements which sub-sets are subsequently used in building up larger networks of elements.

We claim:
1. A method for producing fluid-operated control devices including the steps of producing a first element having a cavity for the interaction of fluid streams, said cavity having optimised characteristics for the control of fluid flow; producing a first inverse copy of said cavity using the first element as a pattern; producing from said inverse copy by a moulding process a plurality of replica elements respectively having cavities with configurations sufficiently identical to that of the first element that the characteristics of the replica elements are substantially identical with the characteristics of the first element; assembling a group of replica elements in an array; froming connecting passages between the cavities of said group of replica elements; producing a second inverse copy of the cavities of said group of replica elements and said connecting passages; and producing from said second inverse copy by a moulding process a member having a group of cavities interconnected by channels, each cavity in this group having a configuration which is sufficiently identical with the cavity of said first element that the characteristics of the cavities of the group are substantially identical with the characteristics of the first element.

2. A method for producing fluid-operated control devices including the steps of producing a first element having a cavity for the interaction of fluid streams, said cavity having optimised characteristics for the control of fluid flow; producing a plurality of first inverse copies of said cavity by a moulding process, each copy of said plurality being produced using said first element as a pattern; assembling the plurality of first inverse copies in an array; forming inverse patterns of connecting passages between different ones of said first inverse copies; and producing from said array of first inverse copies and inverse patterns of connecting passages by a moulding process a member having a plurality of cavities interconnected by channels, each said cavity having characteristics substantially identical with the characteristics of said first element.

3. A method for producing fluid-operated control devices including the steps of producing a first element having a cavity for the interaction of fluid streams, said cavity having optimised characteristics for the control of fluid flow; producing a first inverse copy of said cavity using the first element as a pattern; mounting the first inverse copy in an aperture in a plate, forming on the plate inverse patterns of passages connecting with the first inverse copy; and producing from the combination of said plate and said first inverse copy by a moulding process a structure having a cavity and passages connected therewith, said cavity having characteristics substantially identical to the characteristics of said modified first element.

4. A method as claimed in claim 2 in which said array of inverse copies is assembled by mounting each copy respectively in a separate aperture in a plate, said inverse pattern of connecting passages being formed on said plate.

References Cited

UNITED STATES PATENTS

| | | | |
|---|---|---|---|
| 2,007,025 | 7/1935 | Rieser | 264—220 |
| 2,356,380 | 8/1944 | Chollar | 264—221 |
| 2,472,023 | 5/1949 | Potchen | 264—219 |
| 3,030,979 | 4/1962 | Reilly | 137—624.14 |

OTHER REFERENCES

Harry Diamond Lab.: "Proceedings of the Fluid Amplification Symposium."

JULIUS FROME, Primary Examiner

T. MORRIS, Assistant Examiner

U.S. Cl. X.R.

137—81, 624; 264—220, 226, 227